United States Patent
Wurzer et al.

(10) Patent No.: US 6,811,582 B1
(45) Date of Patent: Nov. 2, 2004

(54) ABRASIVE GRAIN WITH AN ABRASIVE COATING

(75) Inventors: Thomas Wurzer, Velden am Worthersee (AT); Franz Skale, Villach (AT)

(73) Assignee: Treibacher Schleifmitte AG, Laufenburg (DE)

( * ) Notice: Subject to any disclaimer, the term of this patent is extended or adjusted under 35 U.S.C. 154(b) by 0 days.

(21) Appl. No.: 10/111,486

(22) PCT Filed: Oct. 19, 2000

(86) PCT No.: PCT/EP00/10294

§ 371 (c)(1),
(2), (4) Date: Aug. 28, 2002

(87) PCT Pub. No.: WO01/30935

PCT Pub. Date: May 3, 2001

(30) Foreign Application Priority Data

Oct. 25, 1999 (DE) .......................... 199 51 250

(51) Int. Cl.$^7$ .............. C09K 3/14; B24D 3/00
(52) U.S. Cl. ............. 51/307; 51/308; 51/309; 51/298; 51/293
(58) Field of Search ............ 51/298, 295, 307, 51/308, 309, 293

(56) References Cited

U.S. PATENT DOCUMENTS

| | | | | |
|---|---|---|---|---|
| 2,527,044 A | * | 10/1950 | Walton et al. ............... 51/308 |
| 3,269,815 A | * | 8/1966 | Koopman ..................... 51/308 |
| 4,244,989 A | * | 1/1981 | Noomen ...................... 427/180 |
| 4,253,850 A | | 3/1981 | Rue et al. .................... 51/298 |
| 4,918,116 A | * | 4/1990 | Gardziella et al. .......... 523/149 |
| 5,009,674 A | | 4/1991 | Kunz et al. |
| 5,026,404 A | | 6/1991 | Kunz et al. ................... 51/295 |
| 5,035,723 A | * | 7/1991 | Kalinowski et al. .......... 51/309 |
| 5,037,453 A | | 8/1991 | Narayanan et al. ........... 51/307 |
| 5,110,322 A | | 5/1992 | Narayanan et al. ........... 51/309 |
| 5,213,591 A | | 5/1993 | Celikkaya et al. ............ 81/293 |
| 5,269,821 A | | 12/1993 | Helmin et al. ................ 51/295 |
| 5,352,254 A | | 10/1994 | Celikkaya ..................... 51/295 |
| 5,399,606 A | | 3/1995 | Konig et al. ................. 524/385 |
| 5,496,386 A | | 3/1996 | Broberg et al. ............... 51/295 |
| 5,562,745 A | | 10/1996 | Gagliardi et al. ............. 51/298 |
| 5,584,896 A | | 12/1996 | Broberg et al. ............... 51/295 |
| 5,658,360 A | * | 8/1997 | Keil ............................ 51/298 |
| 5,738,695 A | * | 4/1998 | Harmer et al. ................ 51/295 |
| 5,976,204 A | * | 11/1999 | Hammarstrom et al. ...... 51/298 |
| 6,277,160 B1 | * | 8/2001 | Stubbs et al. ................. 51/295 |
| 2002/0184829 A1 | * | 12/2002 | Lemberger et al. .......... 51/298 |

FOREIGN PATENT DOCUMENTS

| | | | |
|---|---|---|---|
| DE | 3030506 C2 | 5/1990 | ........... B24D/3/28 |
| DE | 69016327 T2 | 3/1991 | ........... B24D/3/28 |
| DE | 4328345 A1 | 5/1994 | ........... C08L/61/06 |
| DE | 4243749 A1 | 6/1994 | ........... B24D/5/00 |
| DE | 69301660 T2 | 10/1996 | ........... C09K/3/14 |
| DE | 69302265 T2 | 10/1996 | ........... C09K/3/14 |
| DE | 69410663 T2 | 1/1999 | ........... B24D/3/34 |
| DE | 69506851 T2 | 8/1999 | ........... B24D/3/34 |
| EP | 0008868 | * 3/1980 | |
| EP | 0304616 A1 | 7/1988 | ........... C09K/3/14 |
| GB | 1254781 | * 11/1971 | |
| WO | 94/02562 | * 2/1994 | |
| WO | WO94/02562 | 2/1994 | ........... C09K/3/14 |

* cited by examiner

*Primary Examiner*—Michael Macheschi
(74) *Attorney, Agent, or Firm*—Perkins Smith & Cohen; Jerry Cohen; John Hamilton

(57) ABSTRACT

A flowable, granular abrasive material and method of manufacture thereof. The material is comprised of at least one abrasive grain selected from aluminum oxide, silicon carbide, cubic boron nitride and/or diamond and has a organic or inorganic coating comprised of a binder and an abrasive filling material in the amounts of 0.5 to 8% and 1 to 15% by weight, respectively. The filling material may include sulfides, phosphates, carbonates, halogenides, and/or sulfide-, carbonate- and/or halogenide-containing complex compounds. The binder may include a low-viscosity phenol resin, epoxy resin and/or polyurethane resin.

18 Claims, No Drawings

ABRASIVE GRAIN WITH AN ABRASIVE COATING

The invention on hand relates to an abrasive grain in accordance with the characterizing clause of claim 1, featuring a coating that contains at least one abrasive substance; a method for its production; and its use.

The use of abrasive substances in the production of abradants has been known, and they are frequently used in practice for abradants on a liner (abrasive bands and abrasive papers) as well as for bonded abradants (abrasive disks). The abrasive substances enter into chemical reactions during the grinding or, respectively, cause physical actions that have a positive impact on the grinding process and that lead to an increase of the serviceable life of the tool while simultaneously reducing or completely avoiding any thermal damages to the work piece. Thus, the intended use of the abrasive substances, similar to that of a high-temperature or high-pressure lubricant, is to reduce the friction between the abrasive grain particle and the work piece; to prevent a fusing of the grinding chip with the grain or with the work piece through a reaction with the fresh chip surface; to absorb the heat that is generated in the form of melting, evaporation, sublimation or dissociation heat; and to protect the cutting edges of the abrasive grain particle from any reaction with the material.

Particularly well-suited abrasive substances have turned out to be, e.g., halogenides (chloride of lead, cryolite, fluorite, potassium tetrafluoroborate, et al.); chalcogenides (pyrite, antimony sulfide, zinc sulfide, molybdenum sulfide, et al.); metals with low melting points (Zn, et al.); and high-pressure lubricants (graphite, et al.).

Usually, during the production of the abrasive, the abrasive filling material, in addition to other fillers, is added to the bonding agent mix that is then further processed into the abradant, together with the abrasive grain and other components of the mix (liquid resin, or others). In addition to the abrasive fillers, inactive fillers are frequently used, such as wood or rock dust, chalk, clays et al., that are usually used to fill plastics (for the purpose of saving resins); or compacting fillers, such as, e.g., glass fibers or others, that are used to increase the firmness of the connecting ridge, and/or fillers such as pumice stone or cork powder with the aid of which the self-sharpening properties of an abrasive disk are enhanced.

A disadvantage of this traditional method must be seen in the fact that the abrasive fillers are distributed evenly across the entire abrasive material. However, their abrasive effect is mostly required at a location where the actual abrasive action occurs, to wit: where the abrasive grain collides with the work piece, i.e. in the immediate vicinity of the abrasive grain. Thus, mole abrasive fillers are usually used than would be theoretically necessary which is of significance in so far as suitable substances are frequently very expensive and/or toxic.

In German patent publication DE 2 339 507, abrasive wheels are described that are based on abrasive grains featuring a sealing coating with material-active filler properties.

In each of those cases, it involves coatings that must be seen as specific for the production process and for the corresponding abrasive. Thus, the preferred objective is to make it possible to use hygroscopic, subliming or liquid substances as fillers.

Due to the danger of the formation of agglomerates or agglutination, such coated abrasive grains must be processed immediately. They show the same performance, and it is thus possible to reduce the use of abrasive fillers and to make it possible to use new, less critical fillers.

The invention, on the other hand, is based on the desire to develop abrasive grains that are universally usable for the most varied applications; that feature a coating that contains at least one abrasive filler; that can be stored, that do not have a tendency to agglomerate; and that are of a pourability that is sufficient for trouble-free processing.

One of the objectives of the invention is, above all, to increase the efficacy of the abrasive tool manufactured with the abrasive grain according to the invention which, indirectly, of course, reduces the amount of the abrasive filling material used which brings about additional ecological advantages.

This task is solved by first blending an abrasive grain intensively with a low-viscosity binder and then adding an abrasive filling material that provides the surface of the abrasive grail with a coating that contains an evenly distributed abrasive filler.

It was found that intensive blending of an abrasive grain with a low-viscosity binder and the subsequent adding of an abrasive filler will yield an even coating that can then be precured or precipitation-hardened through temperature treatment or through the addition of hardeners after which the thus treated abrasive grains can be stored even over a longer period without the formation of lumps or agglomerations. The abrasive grains feature excellent pourability and can be used, trouble-free, for the most varied applications. When the abrasive grain is used in abrasive tools, enormous performance increases have been observed.

In comparative tests it was further found that the abrasive grail according to the invention yielded clearly better abrasion outputs when used in abrasive tools as compared to an abrasive tool produced with the same amount of abrasive fillers on the basis of non-coated abrasive grains.

In the first step of the production of the abrasive grain according to the invention, the abrasive grains to be coated are blended with a binder until all grails are coated evenly with the binder.

Conventional abrasive grains such as corundum or SiC as well as the so-called super abrasive materials such as diamond or CBN can be used as abrasive grain. There are no restrictions with regard to grain size. However, the method is preferably used in the macro-grain range.

Inorganic as well as organic binder may be used as binders. Preferably, low-viscosity resins from the group of phenol resins arc used. Very good results have been achieved with base-condensed synthetic resins, or neutral phenol formaldehyde synthetic resins. Resins oil epoxy or polyurethane basis proved to be very suitable as well. But in addition to that, inorganic polymers from the group of silicates or phosphates are also well suited, with the use of aluminum phosphate given preference. The viscosity of the binder should be below 1,000 mPa*s, preferably below 700 mPa*s. The binder portion lies usually between 0.5 and 8 weight percents relative to the abrasive grain used. Particularly good results have been achieved when the binder portion is above 1 weight percent and does not exceed 5 weight percents.

For the blending, the usual mixing aggregates can be used. Using a heatable intensive mixer is advantageous, making it possible to carry out the blending with the binder; the admixing of the active substance, and the drying action (precuring) in one single step. The application of the coating can be done particularly evenly and elegantly in a fluidized bed where the mixing and precuring preferably occur in one process step as well.

In a second step the corresponding active substance is admixed with the abrasive grain coated with binder. One of the advantages of the method is the fact that for this purpose, all known abrasive fillers may be used. Preferably, sulfides, phosphates, carbonates, halogenides and/or complex compounds containing sulfides, phosphates, carbonates or halogenides from the group of elements Na, K, Ca, Mg, Al, Mn, Cu, Sn, Fe, Ti, Sb and/or Zn are used.

Surprisingly, very good results could be achieved with mixtures of calcium fluoride and tricalcium phosphate as well as manganese sulfate and lithium carbonate that were not known as abrasive fillers in this composition. In the case of both combinations, an additional advantage is the fact that they feature no or very low toxicity and that they are easy to handle.

The portion of abrasive filler is usually between 1 and 15 weight percent, preferably between 3 and 10 weight percent, in each case in relation to the amount of abrasive grain used. In order to achieve an even distribution of the filler in the processing of macro grains that cover a range of several millimeters to approximately 50 $\mu$m, the mean particle size of the active material should be below 50 $\mu$m, preferably below 20 $\mu$m. In general, the particle size of the active material should be chosen in such a way that with an even coating of the abrasive grain with active material, the finished granulation will still be within the tolerance of the standard for grain size distribution of the uncoated original granulation. Therefore, for the coating of micro granulations, the abrasive fillers must be used in pigment form. It is particularly advantageous to use solutions of the corresponding abrasive fillers in the micro grain range which comprises grain sizes of approximately 80 $\mu$m down to approximately 1 $\mu$m.

As soon as the active material has been distributed on the abrasive grain particles moistened with binders, a partial or complete thermal hardening of the coating occurs during which the abrasive filler is firmly attached to the grain surface. The drying temperature itself varies, of course, depending on the binder being used. The preferred temperature range for the drying of liquid resins lies between 80 and 130° C. The inorganic binders, on the other hand, must be processed at considerably higher temperatures. For example, a binder on aluminum phosphate basis requires roasting temperatures of at least 400° C., preferably 700° C. in order to achieve a hardening of the coating. All known drying or firing processes or, respectively, aggregates may be used. For many applications it will be advantageous to merely do a thermal precuring, thereby, at the same time, at least partially maintaining the reactivity of the binder in question which can then be used in the incorporation of the coated grain into another system.

If a polyurethane or epoxy resin is used as a binder, the precipitation hardening occurs through the addition of hardeners in accordance with the instructions of the manufacturer in question. In all cases, following the partial or complete hardening, a pourable and storable granulation will be the result that can be processed trouble-free, just like any untreated granulation.

The abrasive grain provided with an abrasive coating finds use in any kind of grinding or polishing tools. The abrasive grain according to the invention can be used particularly advantageously in synthetic-resin bonded abrasive tools (abrasive tools with a backing and abrasive disks or abrasive wheels). Surprisingly, in addition to the foregoing, it was determined within the framework of the tests that the incorporation of the grain into the synthetic-resin bonding per se will be clearly improved, meaning that the use of the abrasive grain according to the invention is not limited only to abrasive tools but makes sense in general with all synthetic-resin bonded products in which corundum is imbedded (laminates, lacquers, and the like).

In the following, the invention will be explained by way of, but without being limited to, a series of examples.

EXAMPLES 1–6

1 kg of regular corundum grain F36 (Alodur ESK, from the firm of Treibacher Schleifmittel) was blended with 15 g and, respectively, 25 g of liquid resin (Peracit 5208G, from the firm of Perstorp) in an intensive mixer for approximately 3 minutes. The viscosity of the resin amounted to 500 mPa*s. Subsequently, 25, 50 and 75 g each of a mixture of calcium fluoride and calcium tri-phosphate (molar mixing ratio 1:1) were added and the mixing process was continued for approximately 1 minute. After this, the grain showed an even coating of abrasive filling material. Even during the mixing, the grain was already being hardened with the use of a hot-air blast, to the extent that abrasive granulation was present even after a prolonged storage period in the form of pourable single grains that could be processed trouble-free.

EXAMPLES 7–9

As in examples 1–6. A mixture of lithium carbonate/manganese sulfate (in the mixing ratio of 1:1) was added as a filler. The amount of liquid resin was 15 g in each case.

EXAMPLE 10

Production occurred in analogy with examples 1–6. The original granulation was admixed with 15 g of liquid resin and subsequently with 50 g of cryolite as active material.

EXAMPLE 11

Production occurred in analogy with examples 1–6. However, 15 g of a liquid resin with a viscosity of 900 mpa*s (type 9457 SL, from the firm of Bakelite). 50 g of the calcium fluoride/calcium tri-phosphate mixture were used as active material.

EXAMPLE 12

Same as example 14 [sic]. Only the type of liquid resin was varied. A liquid resin with a low viscosity of 350 mPa*s (PP 281, from the firm of Vianova) was used.

EXAMPLES 13–18

1 kg of regular corundum of F36 granulation (Alodur ESK, from the firm of Treibacher Schleifmittel) was admixed with 5, 10, and 15 g each of an inorganic binder on aluminum phosphate basis (Fabutit 705, from the firm of Chemische Fabriken Budenhein). 15 and, respectively, 30 g each of a lithium carbonate/manganese sulfide mixture was added as active material. The mixing times were analogous to those in examples 1–6. The coated granulation was subsequently fired in a rotary oven at 600° C.

EXAMPLES 19–20 (Grinding Tests)

Cutting-off wheels were produced in standard fashion with all granulations of examples 1–18; in each case, 815 g of Grain F36 were mixed with 40 g of a high-viscosity liquid resin (ca. 3000 mPa*s/Type 5137, from the firm of Perstorp) and 180 g of a so-called powder bond consisting of 42 weight percent powder resin (Type 5061, from the firm of Perstorp) and 52 weight percent fillers (consisting of ca. 60% pyrite, ca. 35 cryolite % and ca. 5% of calcium oxide). Part of the grain/resin mixture was pressed into a cutting-off wheel in a corresponding mould with a pressure of 90 tons and subsequently hardened for 14 hours at 180° C. The finished wheel had a diameter of 180 mm and a thickness of 3 mm.

In parallel comparison examples,
one standard cutting-off wheel was produced with a non-coated grain (Example 19)
one standard cutting-off wheel was produced with a slightly increased liquid-resin portion (60 g) and a powder bond to which an additional 50 g of a calcium fluoride/calcium tri-phosphate mixture were added (Example 20).

Separation tests were conducted with all disks with a cutting speed of 35 m/s. Construction steel ST37 was used as working material. The work piece itself had a diameter of 6 mm. The G factor is calculated from the ratio of separated area to disk wear.

The test conditions and test results are summarized in the following table:

TABLE 1

Grinding Tests

| Example | Abrasive | Coating Binder | Disk Recipe | G Factor |
|---|---|---|---|---|
| 1 | 15 g of resin type 1 | 25 g of $Ca_2F_3/Ca_3(PO_4)_2$ | Standard | 13 |
| 2 | 25 g of resin type 1 | " | " | " |
| 3 | 15 g of resin type 1 | 50 g of $Ca_2F_3/Ca_3(PO_4)_2$ | " | 16 |
| 4 | 25 g of resin type 1 | " | " | 15 |
| 5 | 15 g of resin type 1 | 75 g of $Ca_2F_3/Ca_3(PO_4)_2$ | " | 12 |
| 6 | 25 g of resin type 1 | " | " | 13 |
| 7 | 15 g of resin type 1 | 25 g of $Li_2CO_3/MnSO_4$ | " | 12 |
| 8 | 15 g of resin type 1 | 50 g of $Li_2CO_3/MnSO_4$ | " | 15 |
| 9 | 15 g of resin type 1 | 75 g of $Li_2CO_3/MnSO_4$ | " | 13 |
| 10 | 15 g of resin type 1 | 50 g of cryolite | " | 13 |
| 11 | 15 g of resin type 2 | 50 g of $Ca_2F_3/Ca_3(PO_4)_3$ | " | 14 |
| 12 | 15 g of resin type 3 | " | " | 12 |
| 13 | 5 g of Al phosphate | 15 g of $Li_2CO_3/MnSO_4$ | " | 14 |
| 14 | 10 g of Al phosphate | " | " | 13 |
| 15 | 15 g of Al phosphate | " | " | 11 |
| 16 | 5 g of Al phosphate | 30 g of $Li_2CO_3/MnSO_4$ | " | 12 |
| 17 | 10 g of Al phosphate | " | " | 13 |
| 18 | 15 g of Al phosphate | " | " | 10 |
| Comparison Examples: | | | | |
| 19 | Standard (state of the art) | | * | 9 |
| 20 | Standard + 20 g of liquid resin + 50 g of $CaF_2/Ca_3(PO_4)_3$ | | ** | 13 |

* = disk with a conventional abrasive grain in a usual recipe that contains abrasive filters directly mixed in with the synthetic-resin binder
** = disk as in 19, in which, however, the amount of abrasive filler (and binder) corresponding to the abrasive coating in Example 3 was added directly to the recipe.

What is claimed is:

1. A flowable, granular abrasive material comprising at least one abrasive grain selected from the group consisting of aluminum oxide, silicon carbide, cubic boron nitride and diamond, said abrasive grain having a coating of an inorganic or an organic binder thereon, wherein said coating further comprises at least one abrasive filling material comprising a mixture of calcium fluoride and calcium tri-phosphate, and wherein the binder is present in an amount of 0.5 to 8% by weight and the filling material is present in the amount of 1 to 15% by weight, each relative to the at least one abrasive grain.

2. The flowable, granular abrasive material according to claim 1, wherein the filling material further comprises at least one material selected from the group consisting of sulfides, phosphates, carbonates, halogenides, and sulfide-, carbonate- and halogenide-containing complex compounds including at least one material selected from the group of elements consisting of Na, Li, K, Mg, Al, Mn, Cu, Sn, Fe, Ti, Sb and ZN.

3. The flowable, granular abrasive material according to claim 1, wherein the abrasive filling material is present in an amount of 1 to 5% by weight relative to the at least one abrasive grain.

4. The flowable, granular abrasive material according to claim 1, wherein the calcium fluoride and calcium tri-phosphate are mixed at a molar ratio of 1:1.

5. The flowable, granular abrasive material according to claim 1, wherein the filling material further comprises a mixture of lithium carbonate and manganese sulfate.

6. The flowable, granular abrasive material according to claim 5, wherein the lithium carbonate and manganese sulfate are mixed at a molar ratio of 1:1.

7. The flowable, granular abrasive material according to claim 1, wherein the binder comprises at least one low-viscosity resin selected from the group consisting of phenol resins, epoxy resins and polyurethane resins.

8. The flowable, granular abrasive material according to claim 7, wherein the viscosity of the resin is less than 1,000 mPa*s.

9. The flowable, granular abrasive material according to claim 7, wherein the viscosity of the resin is less than 700 mPa*s.

10. The flowable, granular abrasive material according claim 1, wherein the binder comprises at least one inorganic polymer from the group consisting of silicates and phosphates.

11. The flowable, granular abrasive material according to claim 10, wherein the binder is an inorganic binder and comprises aluminum phosphate.

12. The flowable, granular abrasive material according to claims 1, wherein the binder is present in an amount of 1 to 5% by weight relative to the at least one abrasive grain.

13. Method of producing a flowable, granular abrasive material, comprising the steps of:
a) mixing at least one abrasive grain with an organic or inorganic binder until the at least one abrasive grain is evenly coated with the binder, wherein the at least one abrasive grain is selected from the group consisting of aluminum oxide, silicon carbide, cubic boron nitride and diamond, and wherein the binder is present in an amount of 0.5 to 8% by weight to the at least one abrasive grain;
b) adding and admixing an abrasive filling material comprising a mixture of calcium fluoride and calcium tri-phosphate with the coated abrasive grains until an even distribution of the abrasive filling material on the surface of the grain has been achieved, wherein the abrasive filling material is present in an amount of 1 to 15% by weight relative to the at least one abrasive grain; and
c) hardening the coating.

14. Method according to claim 13, wherein the binder is an organic binder and the hardening is effected by at least one of (a) the addition of a curing agent or (b) through thermal post-treatment.

15. Method according to claim 14, wherein the thermal post-treatment is conducted at a temperature of between 80 and 130° C.

16. Method according to claim 13, wherein the binder is an inorganic binder and hardening is carried out by thermally treating the binder in a furnace.

17. Method according to claim 16, wherein the thermal post-treatment is conducted at a temperatures of $\geqq 400°$ C.

18. The flowable, granular abrasive material according to claim 1, wherein the abrasive filler is present in an amount of 3 to 10% by weight relative to the at least one abrasive grain.

* * * * *

UNITED STATES PATENT AND TRADEMARK OFFICE
CERTIFICATE OF CORRECTION

PATENT NO. : 6,811,582 B1
DATED : November 2, 2004
INVENTOR(S) : Thomas Wurzer et al.

It is certified that error appears in the above-identified patent and that said Letters Patent is hereby corrected as shown below:

<u>Title page,</u>
Item [73], Assignee, "Treibacher Schleifmitte AG," should read -- Treibacher Schleifmittel AG, --

Signed and Sealed this

Fifth Day of April, 2005

JON W. DUDAS
*Director of the United States Patent and Trademark Office*